(12) United States Patent
Geng

(10) Patent No.: US 6,819,318 B1
(45) Date of Patent: Nov. 16, 2004

(54) METHOD AND APPARATUS FOR MODELING VIA A THREE-DIMENSIONAL IMAGE MOSAIC SYSTEM

(75) Inventor: Z. Jason Geng, 10605 Concord St., #500, Kensington, MD (US) 20895-2504

(73) Assignee: Z. Jason Geng, Rockville, MD (US)

( * ) Notice: Subject to any disclaimer, the term of this patent is extended or adjusted under 35 U.S.C. 154(b) by 433 days.

(21) Appl. No.: 09/617,867

(22) Filed: Jul. 17, 2000

Related U.S. Application Data (60) Provisional application No. 60/145,106, filed on Jul. 23, 1999.

(51) Int. Cl.[7] .............................................. G06T 17/00
(52) U.S. Cl. ...................................... 345/420; 382/154
(58) Field of Search ................................ 345/419, 420, 345/584; 382/154, 294, 284

(56) References Cited

U.S. PATENT DOCUMENTS

| | | | | |
|---|---|---|---|---|
| 5,686,960 A | * | 11/1997 | Sussman et al. ............. | 348/218 |
| 5,732,230 A | * | 3/1998 | Cullen et al. ............... | 345/764 |
| 6,009,190 A | * | 12/1999 | Szeliski et al. ............. | 382/154 |
| 6,157,747 A | * | 12/2000 | Szeliski et al. ............. | 382/284 |
| 6,256,036 B1 | * | 7/2001 | Matsumoto .................. | 345/419 |
| 6,340,974 B1 | * | 1/2002 | Nagashima .................. | 345/584 |
| 6,377,278 B1 | * | 4/2002 | Curtright et al. ........... | 345/634 |
| 6,393,163 B1 | * | 5/2002 | Burt et al. .................. | 382/294 |
| 6,396,491 B2 | * | 5/2002 | Watanabe et al. ........... | 345/419 |

* cited by examiner

*Primary Examiner*—Don Wong
*Assistant Examiner*—Huedung X. Cao
(74) *Attorney, Agent, or Firm*—Steven L. Nichols; Paul W. Fish; Rader, Fishman, & Grauer PLLC (57) ABSTRACT

An imaging method and system for 3D modeling of a 3D surface forms a mosaic from multiple uncalibrated 3D images, without relying on camera position data to merge the 3D images. The system forms the 3D model by merging two 3D images to form a mosaiced image, merging the mosaiced image with another 3D image, and repeating the merging process with new 3D images one by one until the 3D model is complete. The images are aligned in a common coordinate system via spatial transformation and preferably merged using a fuzzy weighting average function to smooth boundary areas between 3D images. The 3D model may be compressed using image compression techniques. In one embodiment, a 2D texture/color overlay is placed over the 3D model to provide a more realistic representation of the object being modeled.

29 Claims, 5 Drawing Sheets

METHOD AND APPARATUS FOR MODELING VIA A THREE-DIMENSIONAL IMAGE MOSAIC SYSTEM

REFERENCE TO RELATED APPLICATIONS

This application claims the benefit of U.S. Provisional Appln. No. 60/145,106, filed Jul. 23, 1999.

TECHNICAL FIELD

The present invention is directed to a system for three-dimensional (3D) image processing, and more particularly to a system that generates 3D models using a 3D mosaic method.

BACKGROUND ART

Three-dimensional (3D) modeling of physical objects and environments is used in many scientific and engineering tasks. Generally, a 3D model is an electronically generated image constructed from geometric primitives that, when considered together, describes the surface/volume of a 3D object or a 3D scene made of several objects. 3D imaging systems that can acquire full-frame 3D images are currently available for generating electronic 3D models of physical objects. Because no single image can capture all of the characteristics of a 3D object, however, completing a 3D model of an object or scene requires taking and integrating multiple 3D images of the same object or scene from various viewpoints. This process is known as "mosaicing" because the various 3D images are combined together to form an image mosaic to generate the complete 3D model.

Currently known 3D modeling systems have several drawbacks. Existing systems require knowledge of the camera's position and orientation at which each 3D image was taken, making the system impossible to use with hand-held cameras or in other contexts where precise positional information for the camera is not available. Further, current systems cannot automatically generate a complete 3D model from 3D images without significant user intervention.

There is a need for a 3D imaging system that does not depend on camera position information to construct the 3D model. There is also a need for a 3D imaging system that can generate a 3D model without requiring extensive user intervention.

SUMMARY OF THE INVENTION

Accordingly, the present invention is a method and system for modeling of a 3D surface that obtains a plurality of uncalibrated 3D images (i.e., 3D images that do not have camera position information), selects and integrates a pair of 3D images, and repeatedly selects and integrates additional 3D images to form a 3D mosaic that creates a 3D model. The invention may also overlay a 2D texture/color overlay on the completed 3D model to provide a more realistic representation of the object being modeled. Further, the invention may compress the 3D model so that the data can be loaded and stored more efficiently.

DETAILED DESCRIPTION OF THE PREFERRED EMBODIMENTS

Figure 1:
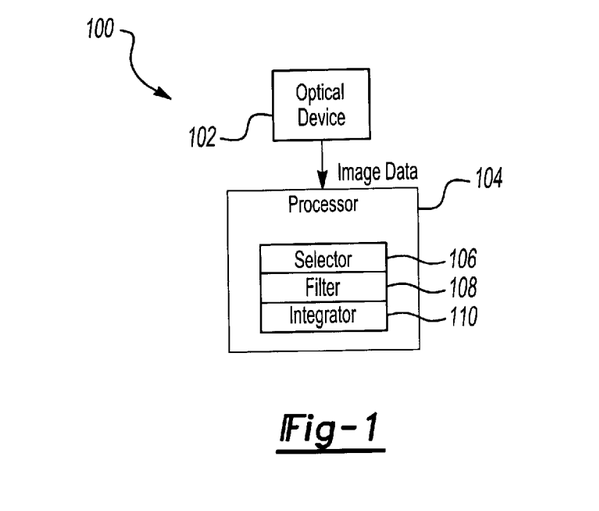
FIG. 1 is a representative block diagram of a system according to the present invention.
Figure 2:
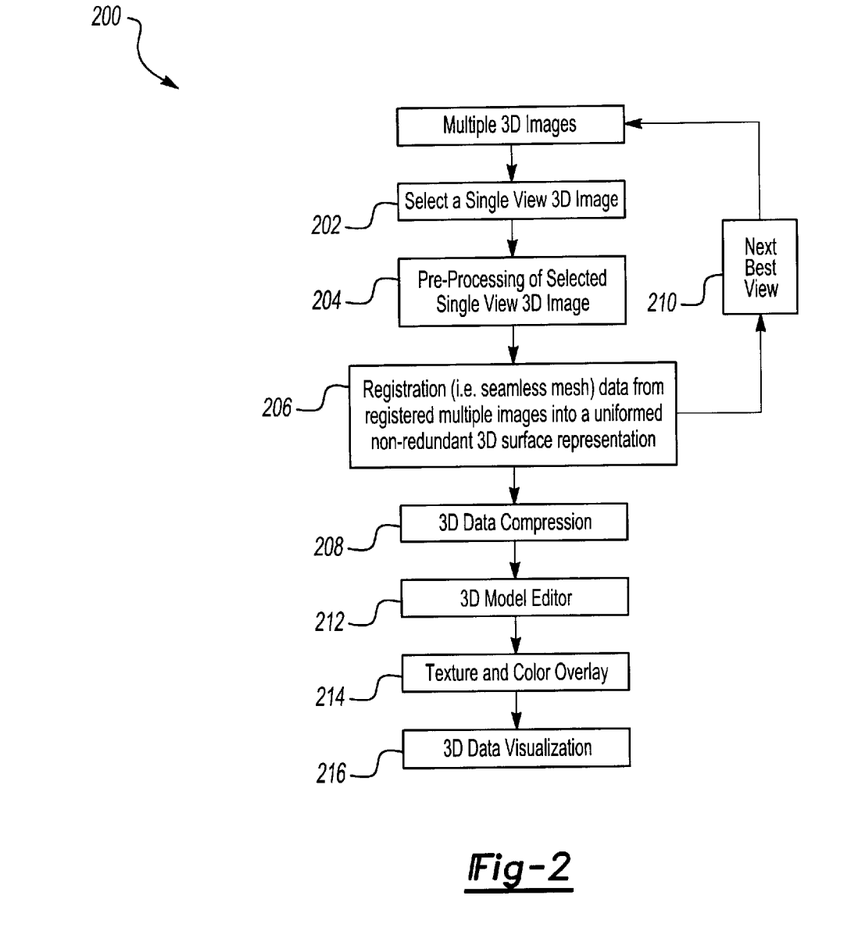
FIG. 2 is a flowchart that illustrates one embodiment of the inventive method.

FIG. 1 is a representative block diagram of a system according to the present invention, and FIG. 2 is a flowchart that illustrates one embodiment of the inventive method. As can be seen in FIG. 1, the inventive system 100 generally includes a camera or optical device 102 for capturing 3D images and a processor 104 that processes the 3D images to construct the model. Preferably, the processor 104 includes means for selecting 3D images 106, a filter 108 that removes unreliable or undesirable areas from each selected 3D image and an integrator 110 that integrates the 3D images to form a mosaiced image that, when completed, forms the 3D model. Portions of the system described above will be described in more detail below.

The optical device 102 can be a 3D camera that acquires full-frame 3D range images of objects in a scene, where the value of each pixel in an acquired 2D digital image accurately represents a distance from the optical device's focal point to a corresponding point on the object's surface. From this data, the (x,y,z) coordinates for all visible points on the object's surface for the 2D digital image can be calculated based on the optical device's geometric parameters (e.g., geometric position and orientation of a camera with respect to a fixed world coordinate, camera focus length, lens radial distortion coefficients). The collective array of (x,y,z) data corresponding to pixel locations on the acquired 2D digital image will be referred to as a "3D image".

Because 3D mosaicing involves images captured in the (x,y,z) coordinate system rather than a simple (x,y) system, 3D mosaics are difficult to piece together to form a 3D model if the images do not contain any positional data for aligning the images together. Conventional methods of 3D image integration rely on the pre-calibrated camera positions to align multiple 3D images and require extensive manual routines to merge the aligned 3D images into a complete 3D model. More specifically, the camera is calibrated to determine the physical relative position of the camera to a world coordinate system. Using the calibration parameters, the 3D images captured by the camera are registered into the world coordinate system through homogeneous transformations. However, this requires extensive information about the camera's position for each 3D image, severely limiting the flexibility in which the camera's position can be moved.

The flowchart shown in FIG. 2 illustrates a preferred method 200 in which 3D images are integrated to form a 3D mosaic and model without requiring position information from pre-calibrated cameras and that can automatically integrate 3D images captured by any 3D camera. Generally, the inventive method focuses on integrating only two 3D images at any given time to form a mosaiced 3D image, and then repeating the integration process between the mosaiced 3D image and another 3D image until all of the 3D images forming the 3D model have been incorporated. For example, the method can start mosaicing a pair of 3D images (e.g., images $I_1$ and $I_2$) within a given set of N frames of 3D images. After integrating images $I_1$ and $I_2$, the integrated 3D image become a new $I_1$ image that is ready for mosaicing with a third image $I_3$. This process continues with subsequent images until all N images are integrated into a complete 3D model. This process will be described in greater detail with reference to FIG. 2.

The inventive method 200 begins by selecting a 3D image 202. The selected image preferably is a "next best" image that overlaps the mosaiced 3D image (or, if there is no mosaiced 3D image yet, an image that overlaps the other 3D image to be integrated) so that multiple 3D images can be matched using only local features of each 3D image, and not camera positions, to piece each image together in the correct position and alignment.

The selected image then undergoes an optional preprocessing step 204 to ensure that the 3D images to be integrated are of acceptable quality. This pre-processing step 204 can include image filtration, elimination of "bad" 3D data from the image, and removal of unreliable or undesirable 3D image data. The pre-processing step 204 may also include removal of noise caused by the camera to minimize or eliminate range errors in the 3D image calculation. Noise removal from the raw 3D camera images can be conducted via a spatial average or wavelet transformation process, to "de-noise" the raw images acquired by the camera 102.

Possible noise filters can consider only the spatial information of the 3D image (spatial averaging) or both the spatial and frequency information (wavelet decomposition). A spatial average filter is based on spatial operations performed on local neighborhoods of image pixels. The image is convoluted with a spatial mask having a window. The spatial average filter has a zero mean, and the noise power is reduced by a factor equal to the number of pixels in the window. Although the spatial average filter is very efficient in reducing random noise in the image, it also introduces distortion that blurs the 3D image. The amount of distortion can be minimized by controlling the window size in the spatial mask.

Noise can also be removed by wavelet decomposition of the original image, which considers both the spatial and frequency domain information of the 3D image. Unlike spatial average filters, which convolute the entire image with the same mask, the wavelet decomposition process provides a multiple resolution representation of an image in both the spatial and frequency domains. Because noise in the image is usually at a high frequency, removing the high frequency wavelets will effectively remove the noise.

Regardless of which, if any, pre-processing operations are conducted on the selected 3D image, the 3D image then undergoes an image alignment step 206. Because the inventive system does not rely upon camera position information or an external coordinate system, the invention relies solely upon the object's 3D surface characteristics, such as surface curvature, to join 3D images together. The 3D surface characteristics are independent of any coordinate system definition or illumination conditions, thereby allowing the invention to produce a 3D model without any information about the camera's position. Instead, the system locates corresponding points in the overlapping areas of the images to be joined and performs a 4×4 homogenous coordinate transformation to align one image with the other in a global coordinate system.

Figure 3:
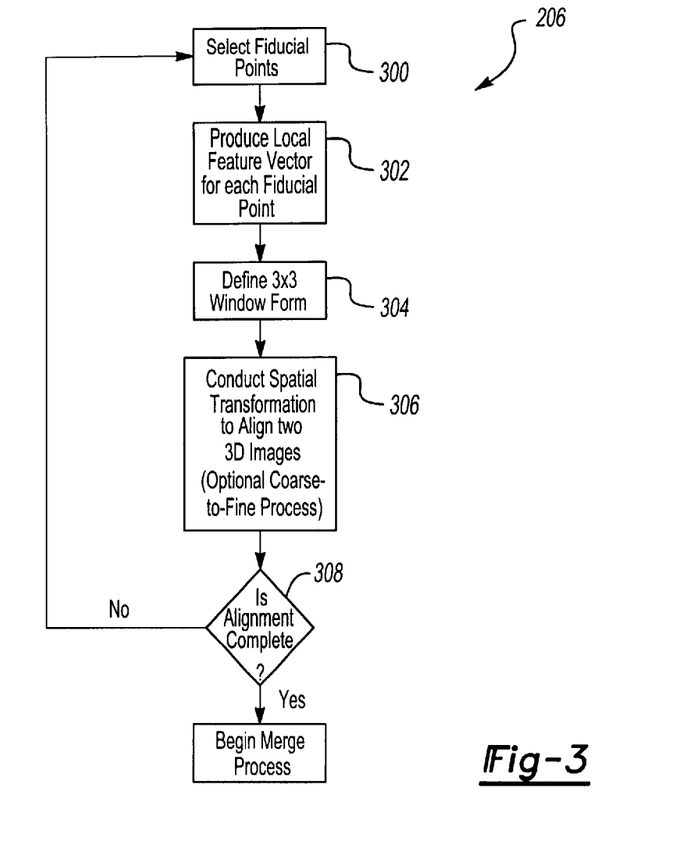
FIG. 3 is a flowchart illustrating an alignment process in the present invention.

The preferred alignment process will be described with reference to FIGS. 3 through 5. As explained above, the 3D images produced by a 3D camera are represented by arrays of (x, y, z) points that describe the camera's position relative to the 3D surface. Multiple 3D images of an object taken from different viewpoints therefore have different "reference" coordinate systems because the camera is in a different position and/or orientation for each image, and therefore the images cannot be simply joined together to form a 3D model.

Previous methods of aligning two 3D images required knowledge of the relative relationship between the coordinate systems of the two images; this position information is normally obtained via motion sensors. However, this type of position information is not available when the images are obtained from a hand-held 3D camera, making it impossible to calculate the relative spatial relationship between the two images using known imaging systems. Even in cases where position information is available, the information tends to be only an approximation of the relative camera positions, causing the images to be aligned inaccurately.

The inventive system provides more accurate image alignment, without the need for any camera position information, by aligning the 3D images based solely on information corresponding to the detected 3D surface characteristics. Because the alignment process in the invention does not need any camera position information, the invention can perform "free-form" alignment of the multiple 3D images to generate the 3D model, even if the images are from a hand-held camera. This free-form alignment eliminates the need for complex positional calibrations before each image is obtained, allowing free movement of both the object being modeled and the 3D imaging device to obtain the desired viewpoints of the object without sacrificing speed or accuracy in generating a 3D model.

A preferred way in which the alignment step 206 is carried out imitates the way in which humans assemble a jigsaw puzzle in that the invention relies solely on local boundary features of each 3D image to integrate the images together, with no global frame of reference. Referring to FIGS. 3 through 5, geometric information of a 3D image can be represented by a triplet I=(x, y, z). To align a pair of 3D images, the invention selects a set of local 3D landmarks, or fiducial points 300, on one image, and defines 3D features for these points that are independent from any 3D coordinate system. The automatic alignment algorithm of the present invention uses the fiducial points $f_i$, i=0, 1, 2 . . . n, for alignment by locating corresponding fiducial points from the other 3D image to be merged and generating a transformation matrix that places the 3D image pair into a common coordinate system.

A local feature vector is produced for each fiducial point at step 302. The local feature vector corresponds to a local minimum curvature and/or maximum curvature. The local feature vector for the fiducial point is defined as $(k_{01}, k_{02})^t$, where $k_{01}$ and $k_{02}$ are the minimum and maximum curvature of the 3D surface at the fiducial point, respectively. The details on the computation of the $k_{01}$ and $k_{02}$ are given below:

$$z(x,y) = \beta_{20}x^2 + \beta_{11}xy + \beta_{02}y^2 + \beta_{10}x + \beta_{01}y + \beta_{00}.$$

Figure 4:
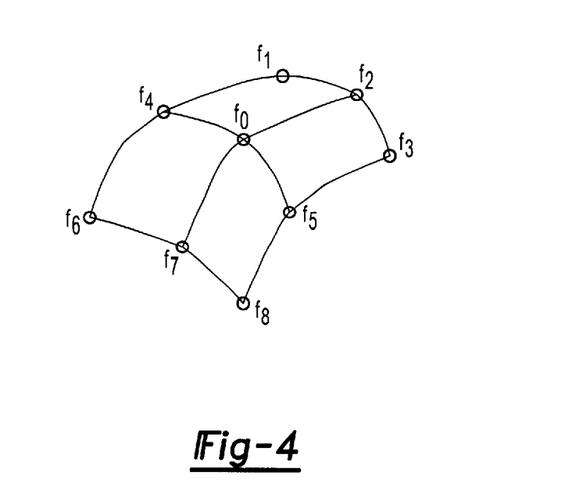
FIGS. 4 and 5 are diagrams showing how two images are aligned.
Figure 5:
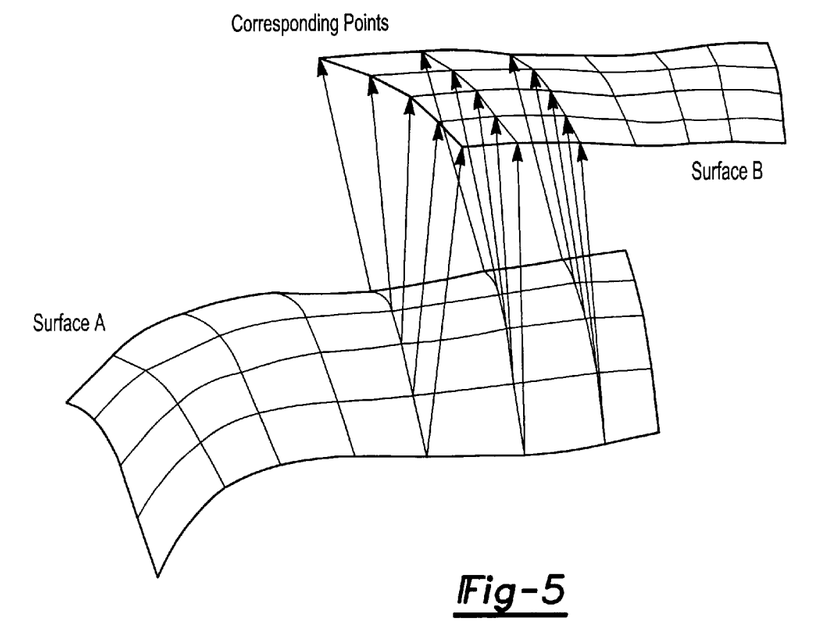

Next, the method defines a 3×3 window for a fiducial point $f_0=(x_0, y_0, z_0)$, which contains all of its 8-connected neighbors $\{f_w=(x_w, y_w, z_w), w=1, \ldots, 8\}$ at step 304, as shown in FIG. 4. The 3D surface is expressed as a second order surface characterization for the fiducial point at $f_0$ and its 8-connected neighbors at step 304. More particularly, the 3D surface is expressed at each of the 9 points in a 3×3 window centered on as one row in the following matrix expression:

$$\begin{bmatrix} z_0 \\ z_1 \\ z_2 \\ z_3 \\ z_4 \\ z_5 \\ z_6 \\ z_7 \\ z_8 \end{bmatrix} = \begin{bmatrix} x_0^2 & x_0 y_0 & y_0^2 & x_0 & y_0 & 1 \\ x_1^2 & x_1 y_1 & y_1^2 & x_1 & y_1 & 1 \\ x_2^2 & x_2 y_2 & y_2^2 & x_2 & y_2 & 1 \\ x_3^2 & x_3 y_3 & y_3^2 & x_3 & y_3 & 1 \\ x_4^2 & x_4 y_4 & y_4^2 & x_4 & y_4 & 1 \\ x_5^2 & x_5 y_5 & y_5^2 & x_5 & y_5 & 1 \\ x_6^2 & x_6 y_6 & y_6^2 & x_6 & y_6 & 1 \\ x_7^2 & x_7 y_7 & y_7^2 & x_7 & y_7 & 1 \\ x_8^2 & x_8 y_8 & y_8^2 & x_8 & y_8 & 1 \end{bmatrix} \begin{bmatrix} \beta_{20} \\ \beta_{11} \\ \beta_{02} \\ \beta_{10} \\ \beta_{01} \\ \beta_{00} \end{bmatrix}$$

or $Z = X\beta$ in vector form, where $\beta = [\beta_{20} \ \beta_{11} \ \beta_{02} \ \beta_{10} \ \beta_{01} \ \beta_{00}]^t$ is the unknown parameter vector to be estimated. Using the least mean square (LMS) estimation formulation, we can express $\beta$ in terms of Z and X:

$$\beta \approx \hat{\beta} = (X^t X)^{-1} X^t Z$$

where $(X^t X)^{-1} X^t$ is the pseudo inverse for X. The estimated parameter vector $\hat{\beta}$ is used for the calculations of the curvatures $k_1$ and $k_2$. Based on known definitions in differential geometry, $k_1$ and $k_2$ are computed based on the intermediate variables, E, F, G, e, f, g:

$$E = 1 + \beta_{20}^2 \quad e = (2\beta_{20})/\sqrt{EG - F^2}$$
$$F = \beta_{10}\beta_{01} \quad f = (2\beta_{11})/\sqrt{EG - F^2}$$
$$G = 1 + \beta_{02}^2 \quad g = (2\beta_{02})/\sqrt{EG - F^2}$$

The minimum curvature at the point $f_0$ is defined as:

$$k_1 = [gE - 2Ff + Ge - \sqrt{(gE + Ge - 2Ff)^2 - 4(eg - f^2)(EG - F^2)}]/[2(EG - F^2)]$$

and the maximum curvature is defined as:

$$k_2 = [gE - 2Ff + Ge + \sqrt{(gE + Ge - 2Ff)^2 - 4(eg - f^2)(EG - F^2)}]/[2(EG - F^2)]$$

In these equations, $k_1$ and $k_2$ are two coordinate-independent parameters indicating the minimum and the maximum curvatures at $f_0$, and they form the feature vector that represents local characteristics of the 3D surface for the image.

Once each of the two 3D images to be integrated have a set of defined local fiducial points, the invention derives a 4×4 homogenous spatial transformation to align the fiducial points in the two 3D images into a common coordinate system at step 306. Preferably, this transformation is carried out via a least-square minimization method, which will be described in greater detail below with reference to FIG. 5.

In this method, the corresponding fiducial point pairs on surface A and surface B are called $A_i$ and $B_i$, i=1, 2, ..., n. Surface A and surface B are overlapping surfaces of the first and second 3D images, respectively. In the least-square minimization method, the object is to find a rigid transformation that minimizes the least-squared distance between the point pairs $A_i$ and $B_i$. The index of the least-squared distance is defined as:

$$I = \sum_{i=1}^{n} |A_i - R(B_i - B_c) - T|^2$$

where T is a translation vector, i.e., the distance between the centroid of the point $A_i$ and the centroid of the point $B_i$. R is found by constructing a cross-covariance matrix between centroid-adjusted pairs of points.

In other words, during the alignment step 206, the invention starts with a first fiducial point on surface A (which is in the first image) and searches for the corresponding fiducial point on surface B (which is in the second image). Once the first corresponding fiducial point on surface B is found, the invention uses the spatial relationship of the fiducial points to predict possible locations of other fiducial points on surface B and then compares local feature vectors of corresponding fiducial points on surfaces A and B. If no match for a particular fiducial point on surface A is found on surface B during a particular prediction, the prediction process is repeated until a match is found. The invention matches additional corresponding fiducial points on surfaces A and B until alignment is complete.

Note that not all measured points have the same amount of error. For 3D cameras that are based on the structured light principle, for example, the confidence of a measured point on a grid formed by the fiducial points depends on the surface angle with respect to the light source and the camera's line-of-sight. To take this into account, the invention can specify a weight factor, $w_i$, to be a dot-product of the grid's normal vector N at point P and the vector L that points from P to the light source. The minimization problem is expressed as a weighted least-squares expression:

$$I = \sum_{i=1}^{n} w_i |A_i - R(B_i - B_c) - T|^2$$

To increase the efficiency and speed of the alignment step 206 alignment process can incorporate a multi-resolution approach that starts with a coarse grid and moves toward finer and finer grids. For example, the alignment process 206 may initially involve constructing a 3D image grid that is one-sixteenth of the full resolution of the 3D image by sub-sampling the original 3D image. The alignment process 206 then runs the alignment algorithm over the coarsest resolution and uses the resulting transformation as an initial position for repeating the alignment process at a finer resolution. During this process, the alignment error tolerance is reduced by half with each increase in the image resolution.

Once the alignment step 206 is complete, the invention merges, or blends, the aligned 3D images to form a uniform 3D image data set at step 208. The object of the merging step 208 is to merge the two raw, aligned 3D images into a seamless, uniform 3D image that provides a single surface representation and that is ready for integration with a new 3D image. As noted above, the full topology of a 3D object is realized by merging new 3D images one by one to form the final 3D model. The merging step 206 smoothes the boundaries of the two 3D images together because the 3D images usually do not have the same spatial resolution or grid orientation, causing irregularities and reduced image quality in the 3D model. Noise and alignment errors also may contribute to surface irregularities in the model.

Figure 6:
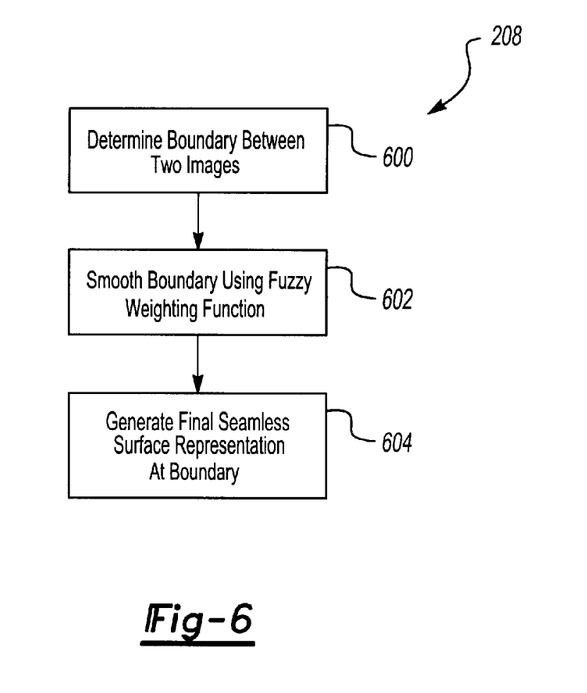
FIG. 6 is a flowchart illustrating a merging process in the present invention.
Figure 7:
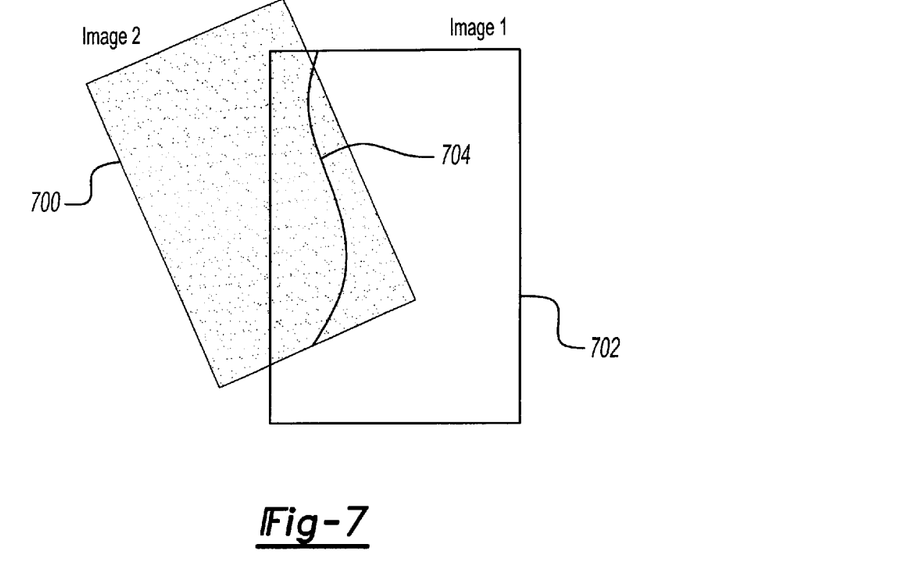
FIGS. 7 and 8 are representative diagrams showing how two images are merged.
Figure 8:
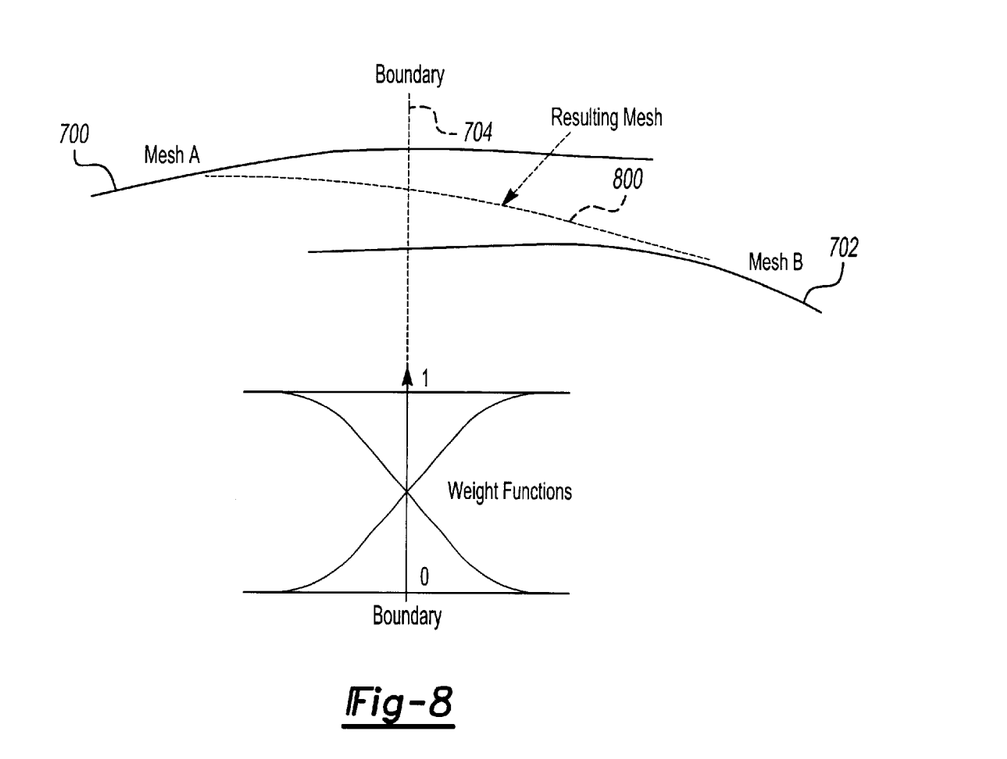

FIG. 6 is a flowchart showing one way in which the merging step 208 can be carried out in the invention, and FIGS. 7 and 8 are diagrams illustrating the merging of 3D images. In a preferred embodiment, multiple 3D images are merged together using fuzzy logic principles and generally includes the steps of determining the boundary between two overlapping 3D images at step 600, using a weighted average of surface data from both images to determine the final location of merged data at step 602, and generating the final seamless surface representation of the two images at step 604. Each one of these steps will be described in greater detail below.

For the boundary determination step 600, the invention can use a method normally used for 2D images described in P. Burt and E. Adelson, "A multi-resolution spline with application to image mosaic", *ACM Trans. On Graphics*, 2(4):217, 1983, the disclosure of which is incorporated by reference herein. As shown in FIG. 7, given two overlapping 3D images 700, 702 with arbitrary shapes on image edges, the invention can determine an ideal boundary line 704 where each point on the boundary lies an equal distance from two overlapping edges. In the boundary determination step 600, 3D distances are used in the algorithm implementation to determine the boundary line 704 shape.

The quality of the 3D image data is also considered in determining the boundary 704. The invention generates a confidence factor corresponding to a given 3D image, which is based on the difference between the 3D surface's normal vector and the camera's line-of-sight. Generally speaking, 3D image data will be more reliable for areas where the camera's line-of-sight is aligned with or almost aligned with the surface's normal vector. For areas where the surface's normal vector is at an angle with respect to the camera's line of sight, the accuracy of the 3D image data deteriorates. The confidence factor, which is based on the angle between the surface's normal vector and the camera's line-of-sight, is used to reflect these potential inaccuracies.

More particularly, the boundary determining step 600 combines the 3D distance (denoted as "d") and the confidence factor (denoted as "c") to obtain a weighted sum that will be used as the criterion to locate the boundary line 704 between the two aligned 3D images 700, 702:

$$D = w_1 d + w_2 c$$

Determining a boundary line 704 based on this criterion results in a pair of 3D images that meet along a boundary with points of nearly equal confidences and distances.

After the boundary determining step, the process smoothes the boundary 700 at step 602 using a fuzzy weighting function. As shown in FIG. 8, the object of the smoothing step 602 is to generate a smooth surface curvature transition along the boundary 700 between the two 3D images, particularly because the 3D images may not perfectly match in 3D space even if they are accurately aligned. To remove any sudden changes in surface curvature in the combined surface at the boundary 704 between the two 3D images 700, 702, the inventive system uses a fuzzy weighting average function to calculate a merging surface 800 based on the average location between two surfaces. Specific ways to implement the fuzzy weighting average function, which is similar to a fuzzy membership function, are described in Geng, Z. J., "Fuzzy CMAC Neural Networks", *Int. Journal of Intelligent and Fuzzy Systems*, Vol. 4, 1995, p. 80–96; and Geng, Z. J and C. McCullough, "Missile Control Using the Fuzzy CMAC Neural Networks", *AIAA Journal of Guidance, Control, and Dynamics*, Vol. 20, No. 3, p. 557, 1997. Once the smoothing step 602 is complete, any large jumps between the two 3D images 700, 702 at the boundary area 704 are merged by an average grid that acts as the merging surface 800 and smoothes surface discontinuities between the two images 700, 702.

After the smoothing step 602, the invention generates a final surface representation of the merged 3D images at step 604. This step 604 can be conducted in several ways, including "stitching" the boundary area between the two 3D images or re-sampling an area that encompasses the boundary area. Both methods involve constructing triangles in both 3D images at the boundary area to generate the final surface representation. Note that although the stitching method is conceptually simple, connecting triangles from two different surfaces creates an exponential number of ways to stitch the two surfaces together, making optimization computationally expensive. Further, the simple stitching procedure often creates some visually unacceptable results due to irregularities in the triangles constructed in the boundary area.

Because of these problems with the stitching method, the re-sampling method is preferred for generating the final surface representation in the invention because it tends to generate an even density of triangle vertices. Generally, the re-sampling process begins with a desired grid size selection (i.e., an average distance between neighboring sampling points on the 3D surface). Next, a linear or quadratic interpolation algorithm calculates the 3D coordinates corresponding to the sampled points based on the 3D surface points on the original 3D images. In areas where the two 3D images overlap, the fuzzy weighting averaging function described above can be applied to calculate the coordinate values for the re-sampled points. This re-sampling process tends to provide a more visually acceptable surface representation.

Once the preprocessing, alignment, and merging steps 204, 206, 208 are completed to form a new 3D image, the mosaicing process continues by selecting a new, "next best" 3D image to integrate 210. The new image preferably covers a neighboring area of the existing 3D image and has portions that significantly overlap the existing 3D image for best results. The process repeats the pre-processing, alignment and merging steps 204, 206, 208 with subsequently selected images 210 until all of the "raw" 3D images are merged together to form a complete 3D model.

After the 3D model is complete, it may be necessary to compress the 3D model data so that it can be loaded, transferred and stored more quickly. As is known in the art and noted above, a 3D model is a collection of geometric primitives that describes the surface and volume of a 3D object. The size of a 3D model of a realistic object is usually huge, ranging from several megabytes (MB) to several hundred MB files. The processing of such a huge 3D model is very slow, even on the state-of-the-art high-performance graphics hardware.

Polygon reduction is a preferred 3D image compression process in the invention at step 212. Polygon reduction generally entails reducing the number of geometric primitives in a 3D model while minimizing the difference between the reduced and the original models. A preferred polygon reduction method also preserves important surface features, such as surface edges and local topology, to maintain important surface characteristics in the reduced model.

More particularly, a preferred compression step 212 used in the invention involves using a multi-resolution triangulation algorithm that inputs the 3D data file corresponding to the 3D model and changes the 3D polygons forming the model into 3D triangles. Next, a sequential optimization process iteratively removes vertices from the 3D triangles based on an error tolerance selected by the user. For example, in dental applications, the user may specify a tolerance of about 25 microns, whereas in manufacturing applications, a tolerance of about 0.01 mm would be acceptable. A 3D distance between the original and reduced 3D model, as shown in FIG. 9, is then calculated to ensure the fidelity of the reduced model.

Figure 9:
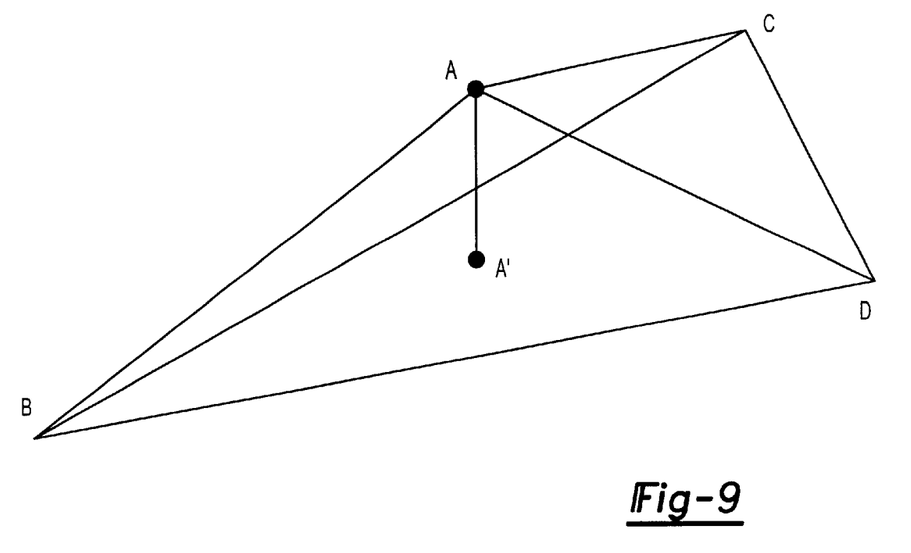
FIG. 9 illustrates one way in which 3D model data can be compressed.

As can be seen in FIG. 9, the "3D distance" is defined as the distance between a removed vertex (denoted as point A in the Figure) in the original 3D model and an extrapolated 3D point (denoted as point A') in the reduced 3D model. A' is on a plane formed by vertices B, C, D in a case when a linear extrapolation method is used. Once this maximum 3D distance among all the removed points exceeds a pre-specified tolerance level, the compression step 212 will be considered complete.

The invention may continue to post-processing steps 214, 216 to enhance the image quality of the 3D model. These post-processing steps 214, 216 can include any miscellaneous 3D model editing functions, such as retouching the model or overlaying the 3D model with a 2D texture/color overlay to provide a more realistic 3D representation of an object. Additionally, texture overlay technique may provide an effective way to reduce the number of polygons in a 3D geometry model while preserve a high level of visual fidelity of 3D objects.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method for three-dimensional (3D) modeling of a 3D surface, comprising the steps of:
   obtaining a plurality of uncalibrated 3D images;
   selecting a pair of 3D images out of the plurality of uncalibrated 3D images;
   integrating the pair of 3D images to form a mosaiced image by matching one or more surface features common to both images in the pair of 3D images; and
   repeating the integrating step by integrating the mosaiced image and a subsequent selected 3D image out of the plurality of uncalibrated 3D images as the pair of 3D images until a 3D model is completed.

2. The method of claim 1, wherein the step of integrating the pair of 3D images includes the steps of:
   filtering the pair of 3D images to remove unwanted areas of the 3D images;
   aligning the pair of 3D images in a selected global coordinate system; and
   merging the pair of 3D images to form the mosaiced image.

3. The method of claim 2, wherein the aligning step conducts alignment based on a surface feature that is independent from a coordinate system definition or an illumination condition.

4. The method of claim 2, wherein the merging step includes the step of blending a boundary between the pair of 3D images.

5. The method of claim 1, wherein the subsequent 3D image selected from the plurality of uncalibrated 3D images is a 3D image that overlaps the mosaiced image and covers an area adjacent to an area covered by the mosaiced image.

6. The method of claim 2, wherein the aligning step includes the steps of:
   selecting a first set of fiducial points on one of said pair of 3D images;
   selecting a second set of fiducial points on the other of said pair of 3D images; wherein said first and second sets of fiducial points correspond to overlapping portions of said pair of 3D images; and
   aligning corresponding fiducial points between said first and second sets of fiducial points to join the pair of 3D images to form the mosaiced image.

7. The method of claim 6, wherein the step of aligning the corresponding fiducial points includes the step of deriving a spatial transformation matrix via a least squares minimization method to align the pair of 3D images into a common coordinate system.

8. The method of claim 4, wherein the blending step includes the steps of:
   determining a boundary area between overlapping portions of the pair of 3D images;
   smoothing the boundary area using a fuzzy weighting averaging function; and
   conducting a re-sampling operation by sampling a plurality of points on the 3D surface and calculating 3D coordinates using an interpolation algorithm on the sampled points.

9. The method of claim 1, further comprising the step of compressing the 3D model via an image compression process.

10. The method of claim 9, wherein the compressing step conducts compression via a multi-resolution triangulation algorithm, which includes the steps of:
    expressing the 3D model as 3D polygons;
    converting the 3D polygons from the expressing step into 3D triangles;
    iteratively removing triangulation vertices from the 3D triangles to generate a reduced 3D model; and
    calculating a 3D distance between the 3D model and the reduced 3D model.

11. The method of claim 1, further comprising the step of overlaying a two-dimensional (2D) texture/color overlay over the 3D model.

12. An apparatus for three-dimensional (3D) modeling of a 3D surface, comprising:
    an optical device that obtains a plurality of uncalibrated 3D images that include data corresponding to a distance between a focal point of the optical device and a point on the 3D surface; and
    a processor coupled to the optical device that includes:
      a selector that selects a pair of 3D images out of the plurality of uncalibrated 3D images obtained by the optical device; and
      an integrator that integrates the pair of 3D images to form a mosaiced image by matching one or more surface features common to both images in the pair of 3D images,
      wherein the integrator repeats the integration process by integrating the mosaiced image and a subsequent 3D image selected from of the plurality of uncalibrated 3D images as the pair of 3D images until a 3D model is completed.

13. The apparatus of claim 12, wherein the processor further includes a filter that removes undesired areas of the 3D images before the integrator integrates the 3D images.

14. The apparatus of claim 12, wherein the integrator integrates the 3D images by aligning the pair of 3D images in a selected global coordinate system based on a surface feature that is independent from a coordinate system definition and merging the pair of 3D images to form the mosaiced image.

15. The apparatus of claim 12, wherein the integrator integrates the 3D images by
    selecting a first set of fiducial points on one of said pair of 3D images;
    selecting a second set of fiducial points on the other of said pair of 3D images, wherein said first and second sets of fiducial points correspond to overlapping portions of said pair of 3D images; and aligning corresponding fiducial points between said first and second sets of fiducial points to join the pair of 3D images to form the mosaiced image.

16. The apparatus of claim 15, wherein the integrator aligns the corresponding fiducial points by deriving a spatial transformation matrix via a least square minimization method to align the pair of 3D images into a common coordinate system.

17. The apparatus of claim 15, wherein the integrator lends a boundary between 3D images by:
   determining a boundary area between overlapping portions of the pair of 3D images;
   smoothing the boundary area using a fuzzy weighting averaging function; and
   conducting a re-sampling operation by sampling a plurality of points on the 3D surface and calculating 3D coordinates using an interpolation algorithm on the sampled points.

18. The apparatus of claim 12, wherein the processor further comprises a compressor that compresses data corresponding to the 3D model.

19. The apparatus of claim 18, wherein the compressor step conducts compression via a multi-resolution triangulation algorithm by:
   expressing the 3D model as 3D polygons;
   converting the 3D polygons into 3D triangles;
   iteratively removing triangulation vertices from the 3D triangles to generate a reduced 3D model; and calculating a 3D distance between the 3D model and the reduced 3D model.

20. The apparatus of claim 12, wherein the processor further comprises an overlay mechanism that overlays the 3D model with a two-dimensional (2D) texture/color overlay.

21. A system for three-dimensional (3D) modeling of a 3D surface, comprising:
   means for obtaining a plurality of uncalibrated 3D images;
   means for selecting a pair of 3D images out of the plurality of uncalibrated 3D images; and
   means for integrating a pair of 3D images to form a mosaiced image by matching one or more surface features common to both images; and
   wherein said means for integrating repeatedly integrates the mosaiced image with another 3D image from the plurality of uncalibrated 3D images until a 3D model is completed.

22. The system of claim 21, wherein the means for integrating further comprise:
   means for filtering the pair of 3D images to remove unwanted areas of the 3D images;
   means for aligning the pair of 3D images in a selected global coordinate system; and
   means for merging the pair of 3D images to form the mosaiced image.

23. The system of claim 22, wherein the means for merging include means for blending a boundary between the pair of 3D images.

24. The system of claim 22, wherein the means for aligning include:
   means for selecting a first set of fiducial points on one of said pair of 3D images;
   means for selecting a second set of fiducial points on the other of said pair of 3D images, wherein said first and second sets of fiducial points correspond to overlapping portions of said pair of 3D images; and
   means for aligning corresponding fiducial points between said first and second sets of fiducial points to join the pair of 3D images to form the mosaiced image.

25. The system of claim 24, wherein the means for aligning the corresponding fiducial points include means for deriving a spatial transformation matrix via a least squares minimization method to align the pair of 3D images into a common coordinate system.

26. The system of claim 23, wherein the means for blending a boundary include:
   means for determining a boundary area between overlapping portions of the pair of 3D images;
   means for smoothing the boundary area using a fuzzy weighting averaging function; and
   means for conducting a re-sampling operation by sampling a plurality of points on the 3D surface and calculating 3D coordinates using an interpolation algorithm on the sampled points.

27. The system of claim 21, further comprising means for compressing the 3D model via an image compression process.

28. The system of claim 27, wherein the means for compressing conduct compression via a multi-resolution triangulation algorithm and further comprise:
   means for expressing the 3D model as 3D polygons;
   means for converting the 3D polygons from the expressing step into 3D triangles;
   means for iteratively removing triangulation vertices from the 3D triangles to generate a reduced 3D model; and
   means for calculating a 3D distance between the 3D model and the reduced 3D model.

29. The system of claim 21, further comprising means for overlaying a two-dimensional (2D) texture/color overlay over the 3D model.

* * * * *

UNITED STATES PATENT AND TRADEMARK OFFICE
CERTIFICATE OF CORRECTION

PATENT NO. : 6,819,318 B1
DATED : November 16, 2004
INVENTOR(S) : Z. Jason Geng It is certified that error appears in the above-identified patent and that said Letters Patent is hereby corrected as shown below:

Column 11,
Line 10, change "lends" to -- blends --

Signed and Sealed this

Eighth Day of February, 2005

JON W. DUDAS
*Director of the United States Patent and Trademark Office*